US009043208B2

United States Patent
Koch et al.

(10) Patent No.: US 9,043,208 B2
(45) Date of Patent: *May 26, 2015

(54) SYSTEM, METHOD AND PROGRAM PRODUCT FOR PROVIDING AUTOMATIC SPEECH RECOGNITION (ASR) IN A SHARED RESOURCE ENVIRONMENT

(75) Inventors: Fernando Luiz Koch, Sao Paulo (BR); Julio Nogima, Londrina (BR)

(73) Assignee: International Business Machines Corporation, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 13/571,409

(22) Filed: Aug. 10, 2012

(65) Prior Publication Data

US 2014/0025377 A1     Jan. 23, 2014

Related U.S. Application Data (63) Continuation of application No. 13/551,645, filed on Jul. 18, 2012.

(51) Int. Cl.
| | |
|---|---|
| *G10L 15/00* | (2013.01) |
| *G10L 15/28* | (2013.01) |
| *G10L 15/30* | (2013.01) |
| *G10L 15/18* | (2013.01) |
| *G10L 15/32* | (2013.01) |
| *G10L 15/22* | (2006.01) |

(52) U.S. Cl.
CPC ............. *G10L 15/30* (2013.01); *G10L 15/1822* (2013.01); *G10L 15/32* (2013.01); *G10L 2015/228* (2013.01)

(58) Field of Classification Search
CPC .............................. G10L 15/22; G10L 15/063
USPC .......................... 704/249, 231, 251, 244, 255
See application file for complete search history.

(56) References Cited

U.S. PATENT DOCUMENTS

| | | | | |
|---|---|---|---|---|
| 5,212,730 | A | * | 5/1993 | Wheatley et al. .............. 704/243 |
| 5,513,298 | A | | 4/1996 | Stanford et al. |
| 5,797,122 | A | * | 8/1998 | Spies ............................ 704/255 |
| 6,308,151 | B1 | * | 10/2001 | Smith ........................... 704/235 |
| 6,442,519 | B1 | | 8/2002 | Kanevsky et al. |
| 6,513,006 | B2 | * | 1/2003 | Howard et al. ............... 704/257 |

(Continued)

OTHER PUBLICATIONS

Biadsy, et al., (2010), "Dialect Recognition Using a Phone-GMM-Supervector-Based SVM Kernel".

(Continued)

*Primary Examiner* — Shaun Roberts
(74) *Attorney, Agent, or Firm* — Law Office of Charles W. Peterson, Jr.; Louis J. Percello, Esq.

(57) ABSTRACT

A speech recognition system, method of recognizing speech and a computer program product therefor. A client device identified with a context for an associated user selectively streams audio to a provider computer, e.g., a cloud computer. Speech recognition receives streaming audio, maps utterances to specific textual candidates and determines a likelihood of a correct match for each mapped textual candidate. A context model selectively winnows candidate to resolve recognition ambiguity according to context whenever multiple textual candidates are recognized as potential matches for the same mapped utterance. Matches are used to update the context model, which may be used for multiple users in the same context.

25 Claims, 7 Drawing Sheets

(56) References Cited

U.S. PATENT DOCUMENTS

| | | | |
|---|---|---|---|
| 6,553,345 B1* | 4/2003 | Kuhn et al. | 704/275 |
| 6,868,379 B1* | 3/2005 | Wutte | 704/235 |
| 7,243,069 B2* | 7/2007 | Jaepel et al. | 704/235 |
| 7,437,296 B2* | 10/2008 | Inoue et al. | 704/275 |
| 7,966,182 B2* | 6/2011 | Orcutt | 704/251 |
| 8,086,444 B2 | 12/2011 | Jarmulak et al. | |
| 8,301,450 B2* | 10/2012 | Lee et al. | 704/257 |
| 8,332,218 B2* | 12/2012 | Cross et al. | 704/231 |
| 8,521,526 B1* | 8/2013 | Lloyd et al. | 704/236 |
| 2002/0077830 A1* | 6/2002 | Suomela et al. | 704/275 |
| 2002/0116194 A1* | 8/2002 | Lewis et al. | 704/257 |
| 2002/0188447 A1* | 12/2002 | Coon et al. | 704/249 |
| 2007/0124147 A1* | 5/2007 | Gopinath et al. | 704/257 |
| 2007/0294085 A1* | 12/2007 | Gaos et al. | 704/252 |
| 2009/0326937 A1* | 12/2009 | Chitsaz et al. | 704/235 |
| 2011/0161077 A1* | 6/2011 | Bielby | 704/231 |
| 2011/0288868 A1* | 11/2011 | Lloyd et al. | 704/251 |

OTHER PUBLICATIONS

Biadsy, et al., (2011), "Dialect and Accent Recognition Using Phonetic-Segmentation Supervectors".

Zissman, et al., "Automatic Dialect Identification of Extemporaneous, Conversational, Latin American Spanish Speech," Aug. 1994.

* cited by examiner

SYSTEM, METHOD AND PROGRAM PRODUCT FOR PROVIDING AUTOMATIC SPEECH RECOGNITION (ASR) IN A SHARED RESOURCE ENVIRONMENT

CROSS REFERENCE TO RELATED APPLICATION

The present invention is a continuation of U.S. application Ser. No. 13/551,645, "SYSTEM, METHOD AND PROGRAM PRODUCT FOR PROVIDING AUTOMATIC SPEECH RECOGNITION (ASR) IN A SHARED RESOURCE ENVIRONMENT" to Fernando Luiz Koch et al., filed Jul. 18, 2012, assigned to the assignee of the present invention and incorporated herein by reference.

BACKGROUND OF THE INVENTION

1. Field of the Invention

The present invention is related to Automatic Speech Recognition (ASR) and more particularly to improving automatic speech recognition accuracy on networked computer systems such as in a cloud based system.

2. Background Description

A typical state of the art automatic speech recognition (ASR) system uses an acoustic model to map utterances to specific phones or words, and a language model to determine the likelihood of the mapped words in a string of words. Using this information, the ASR system searches for the pattern (word or sentence) with the highest probability to match each utterance. An adaptation component takes the recognized utterance, the word sequence and the extracted features from the speech signal, and updates the acoustic model from it.

While speech accuracy of state of the art speech recognition systems is, generally, relatively high, prior speech recognition systems still make frequent errors from inappropriate recognition. To reduce errors and improve accuracy, single user systems train with the user, using acoustics, language, and/or grammar based training or external commands/input to hone the acoustic and language models. This training may be further supplemented with local context information, such as, for example, information gleaned from dialect detection and background noise removal.

While a single user system may improve recognition with additional training, there are many existing or potential multi-user ASR applications in more general situations. Existing ASR systems fall short of the precision required for these situations, which include, for example, call centers, emergency coordination centers and closed captioning for live television broadcasts. Extensive training may be unfeasible for these multi-user applications. Other approaches to improving ASR accuracy for multi-user use have relied either on further speech signal processing or on modifying acoustic/language model parameters to accommodate to a particular speaker or environmental conditions. Regardless of whether additional training, speech signal processing and/or acoustic/language model parameter modification is used to improve accuracy, however, these state of the art approaches have required substantial resources, e.g., time, processing power and storage space.

Moreover, the demand for automatic speech recognition reaches beyond the typical desktop computer to lightweight, handheld mobile devices. Mobile computing devices can be characterized as lightweight and a small form factor or footprint and have become ubiquitous. Mobile phones, tablets and smart phones, for example, are typical such mobile computing devices. With each generation, these mobile devices have become more and more user friendly, providing users with more and more features and function. However, making these devices user friendly has meant constraining the device architecture, reducing processing power (i.e., using power efficient, low power processors) and limiting power supplied, to fit the small footprint and provide hours of service on a compact, lightweight power cell or battery.

Automatic speech recognition would have natural application to smart phones, for example, both to facilitate users interfacing with and to expand the capability of, the device. Providing more sophisticated capability, such as automatic speech recognition, in a mobile device is at odds, however, with the size and power constraints in the same low-power, lightweight device and in fitting the devices in a small footprint. A typical state of the art mobile device may be capable of very rudimentary speech recognition, such as name or number recognition for voice dialing or menu navigation. However, these mobile devices do not have sufficient capacity for more robust speech recognition. So, while the added flexibility of mobile devices may open the door for more broad application of ASR, state of the art mobile devices have not be capable of taking advantage of those more broad applications.

Recently, when local computing capability has fallen short, excess load has been off-loaded to a shared Information Technology (IT) Infrastructure, typically called the cloud, to meet the shortfall. Cloud service providers (e.g., providing capability on mainframe computers, servers or other cloud computers) share resources and services, and handle data-intensive computing tasks that might otherwise exceed the local capacity or capability, or that might run intolerably slow on local facilities. Because mobile devices and other low end computing, in particular, may be inadequate for automatic speech recognition, much of the ASR load has been off-loaded to the cloud, e.g., for processing a captured speech stream or a representation thereof to generate text.

However, even with extensive training these state of the art approaches to improving recognition (training, local context and cloud computing), have still fallen short of reaching a level of precision suitable for natural speech communication. extensive training is unfeasible in scenarios, such as, for example, call centers, live TV broadcasts, and emergency coordination centers. Especially in those scenarios, these state of the art approaches have been inadequate.

Thus, there is a need for enhanced automatic speech recognition, in particular for mobile devices and for sustained voice to machine interaction; and especially for improved recognition where extensive training is unfeasible.

SUMMARY OF THE INVENTION

A feature of the invention is improved untrained automatic speech recognition;

Another feature of the invention is a human-computational interface for mobile devices with improved untrained automatic speech recognition;

Yet another feature of the invention is improved automatic speech recognition with recognition results having a level of precision required for natural speech communication, even where extensive training is unfeasible.

The present invention relates to a speech recognition system, method of recognizing speech and a computer program product therefor. A client device identified with a context for an associated user selectively streams audio to a provider computer, e.g., a cloud computer. Speech recognition receives streaming audio, maps utterances to specific textual candidates and determines a likelihood of a correct match for each mapped textual candidate. A context model selectively winnows candidate to resolve recognition ambiguity according to context whenever multiple textual candidates are recognized as potential matches for the same mapped utterance. Matches are used to update the context model, which may be used for multiple users in the same context.

Embodiments of the invention include:

An Automatic Speech Recognition (ASR) method comprising: extracting utterances from each of one or more audio streams; generating textual candidates for each extracted utterance, one or more utterances having a plurality of textual candidates generated as potential matches; winnowing potential matches with a context model within each particular context to adjust likelihood of potential matches; selecting a single textual candidate for said extracted utterance as a match; and updating said context model responsive to each match. The context may indicate time, location, activity or social setting.

In this embodiment utterances may have a single textual candidates generated are matched. Generating textual candidates generates a probability for each potential match, said probability indicating the likelihood that the respective textual candidate is a match and wherein for each of said one or more utterances any single one of said plurality of textual candidates having a probability exceeding the probability of every other one of said plurality of textual candidates by a selected threshold is a match. Winnowing potential matches may comprise said context model weighting each said probability. The context model may maintain a count of each previously recognized word occurring within each previously encountered context. Each said probability may be weighted by the count of a respective said textual candidate for the respective context normalized to the highest count for said plurality of textual candidates.

Also, the one or more audio streams may be received from one or more client devices. The one or more provider computers may be recognizing speech in said one or more audio streams, said one or more provider computers sharing capacity, resources and recognizing speech in a cloud environment. The context model may be a group context model, said one or more client devices may be associated with group members, corresponding ones of said one or more audio streams may be recognized in the same context.

An Automatic Speech Recognition (ASR) method comprising: receiving one or more audio streams from one or more client devices; extracting utterances from each of said one or more audio streams; generating textual candidates for each extracted utterance and a probability that each candidate is a match, every utterance having a single textual candidate generated is matched, remaining utterances having a plurality of textual candidates generated are unmatched, each of said a plurality of textual candidates being a potential match; winnowing potential matches with a context model within each particular context to adjust likelihood of potential matches; selecting a single textual candidate for said extracted utterance as a match; and updating said context model responsive to each match.

A computer program product for Automatic Speech Recognition (ASR), said computer program product comprising a computer usable medium having computer readable program code stored thereon, said computer readable program code causing one or more computer executing said code to: extract utterances from each of one or more audio streams; generate textual candidates for each extracted utterance, one or more utterances having a plurality of textual candidates generated as potential matches; winnow potential matches with a context model within each particular context to adjust likelihood of potential matches; select a single textual candidate for said extracted utterance as a match; and update said context model responsive to each match.

A computer program product for Automatic Speech Recognition (ASR), said computer program product comprising a computer usable medium having computer readable program code stored thereon, said computer readable program code causing a plurality of computers including provider computers executing said code to: receive one or more audio streams from one or more client devices; extract utterances from each of said one or more audio streams; generate textual candidates for each extracted utterance and a probability that each candidate is a match, every utterance having a single textual candidate generated is matched, remaining utterances having a plurality of textual candidates generated are unmatched, each of said a plurality of textual candidates being a potential match; winnow potential matches with a context model within each particular context to adjust likelihood of potential matches; select a single textual candidate for said extracted utterance as a match; and update said context model responsive to each match.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
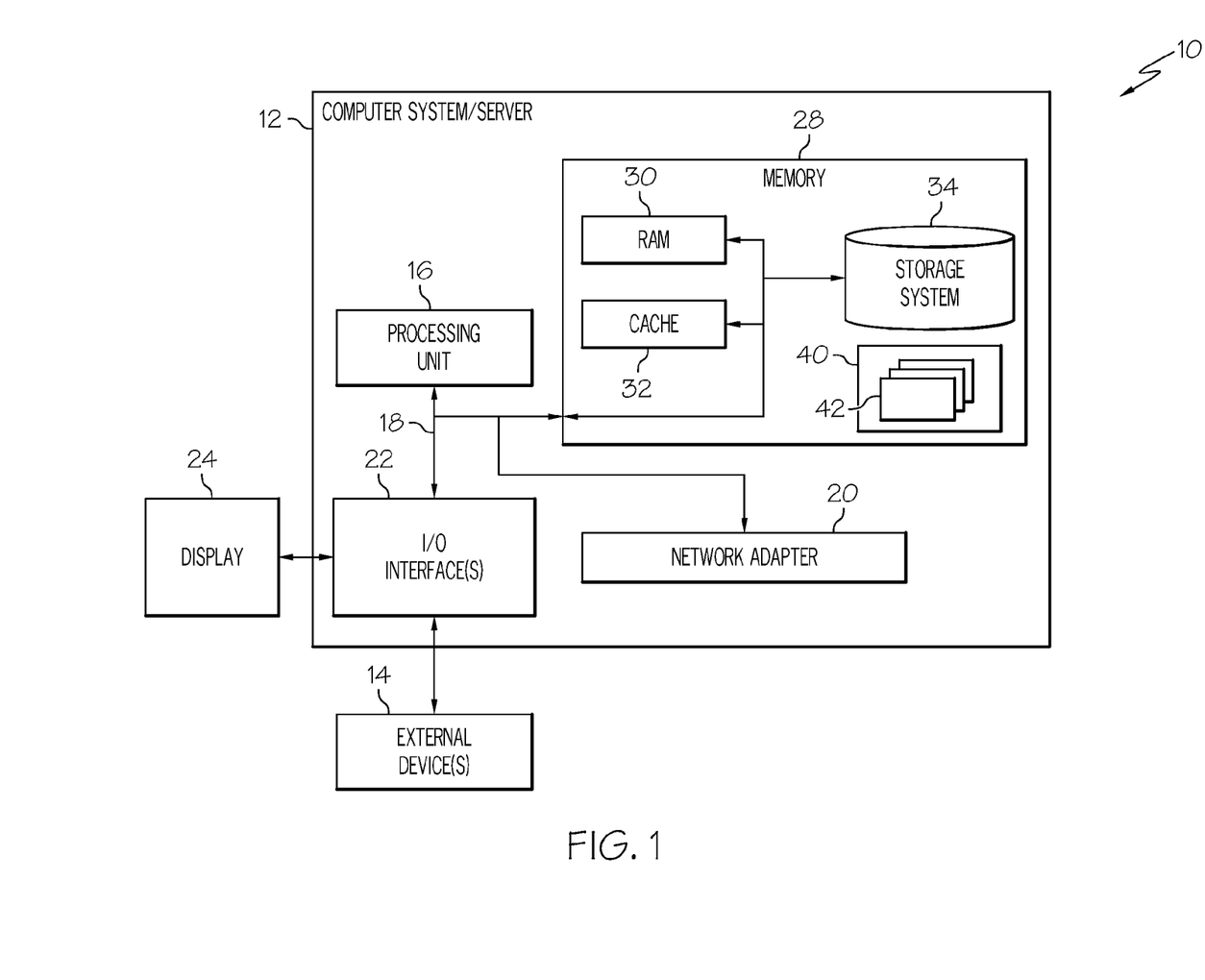
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
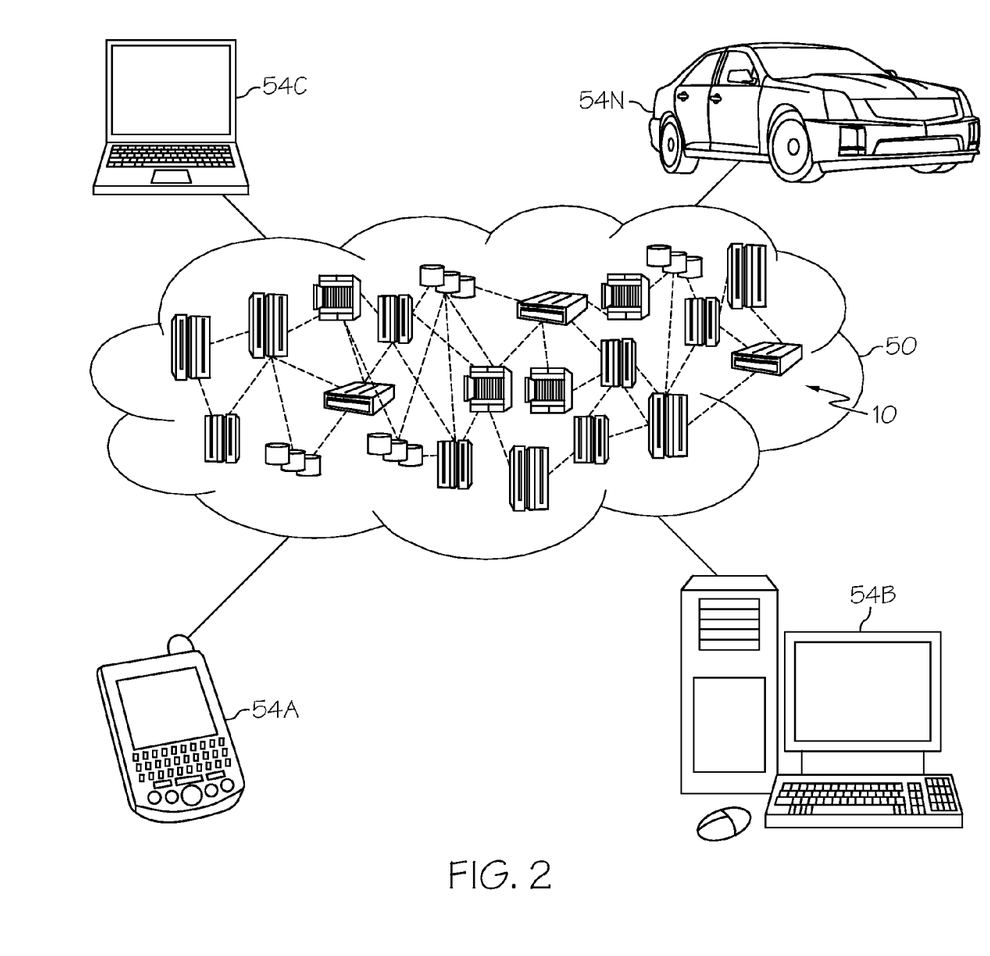
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
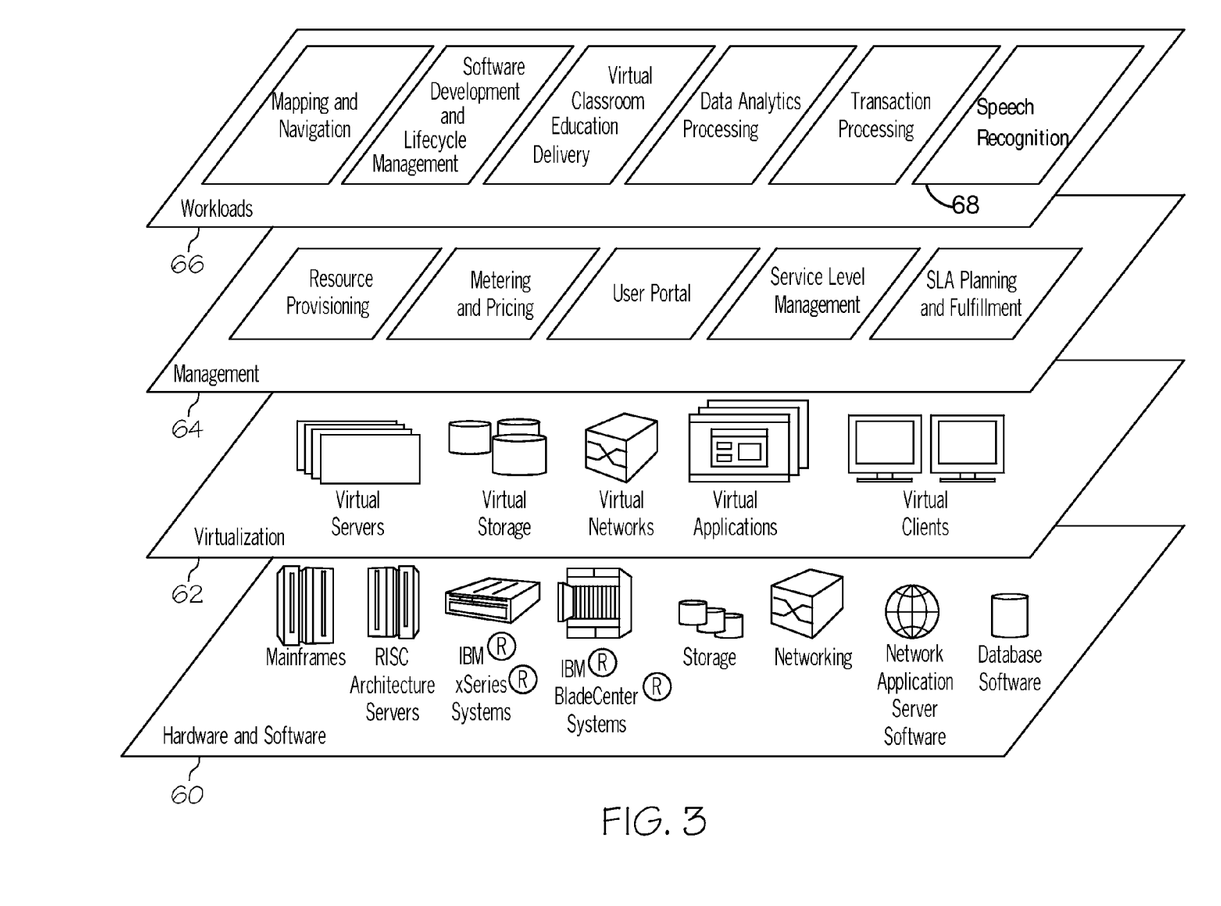
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and automatic speech recognition (ASR) 68.

Figure 4:
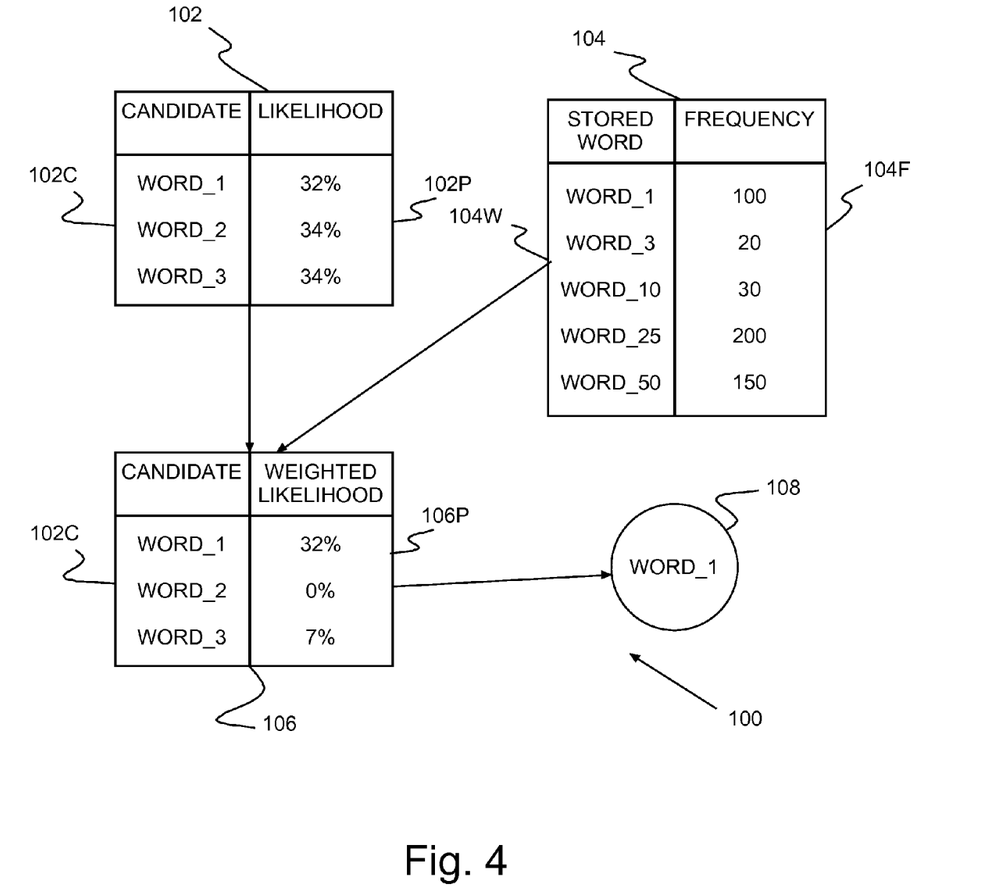
FIG. 4 shows an example of application of context enhanced speech recognition (CESR) using shared context information collected, e.g., over the cloud, to facilitate automatic speech recognition according to a preferred embodiment of the present invention.

FIG. 4 shows an example of application of context enhanced speech recognition (CESR) 100 using shared context information collected, e.g., over the cloud, to facilitate automatic speech recognition according to a preferred embodiment of the present invention. Preferred context enhanced speech recognition 100 improves recognition accuracy using remotely stored information, previously classified for context. Thus, a preferred system and method continuously recognizes, classifies and selectively refines speech recognition based on real-time end-user local context variations. Further, preferred context enhanced speech recognition 100 establishes a user level context for compound words, as well as single words, providing a simpler human computer interface (HCI) for an improved user experience.

Again, as noted hereinabove, although described with reference to cloud computing, the present invention has application beyond cloud computing. For example, the present invention may be applied to state of the art resource scheduling systems such as booking systems for health services, appointments, rental cars and tickets for venues; and further, to activity and appointment scheduling systems. Context enhanced speech recognition according to the present invention has application, in particular, to crowdsourcing where people may exchange information, e.g., alerts, content, interests and traffic. Further, the present invention has application to systems for handling disaster and emergency situations.

In this simple example 100, state of the art ASR has generated an inconclusive list 102 of word candidates 102C. ASR has included a corresponding probability 102P that each candidate 102C is a match. In this example, each candidate 102C has substantially the same probability 102C. A context model shades the list based on real-time variations of end-user local context, searches previously aggregated information to list candidates by context frequency 104, to winnow the list 102 and arrive at a refined candidate list 106. In this example, the candidate context frequency list 104 lists corresponding previously recognized words 104W aggregated according to the frequency 104F each has occurred within the current end-user local context. The refined candidate list 106 lists the same candidates 102C and a weighted probability 106P for each, weighted based on context frequency 104F. While it may be apparent that one candidate 108 is a match, if multiple candidates remain, the context model may be iteratively applied to those remaining candidates, winnowing the list 102C until a single matching candidate is identified 108.

Figure 5:
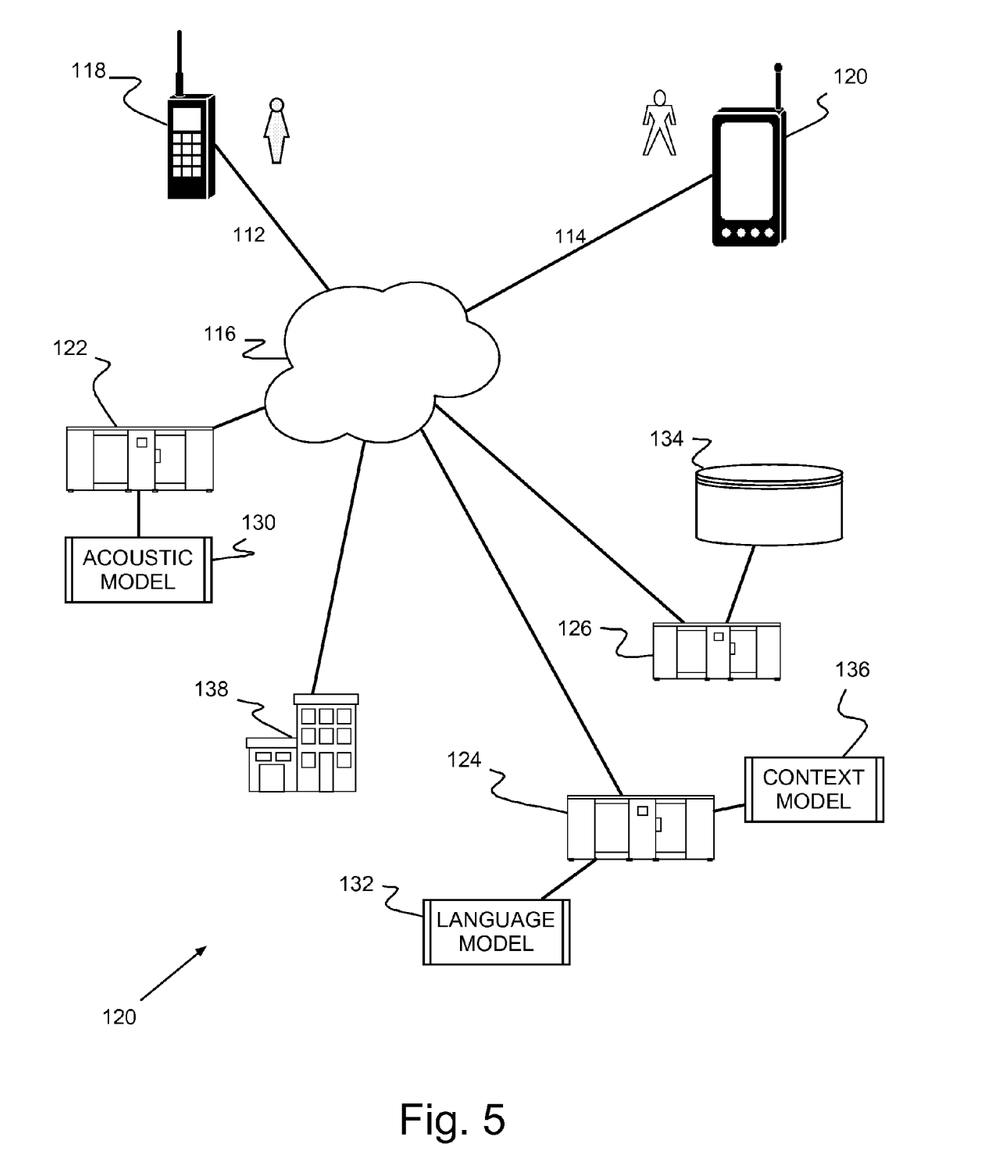
FIG. 5 shows an example of a preferred context enhanced speech recognition system receiving speech in multiple audio streams over a network from devices for respective end-users, each in a particular context scenario, e.g., from cloud computers.

FIG. 5 shows an example of a preferred context enhanced speech recognition system 110, e.g., in one or more cloud computers, receiving speech in multiple audio streams 112, 114 over a network 116 from devices 118, 120 for respective end-users, each in a particular context scenario. The context may be determined by device local context, or by the receiving end of the speech (e.g., a 911 call to an Emergency Control Center or a customer service call). In this example, context is described by a cross-relation between a number of situational variables, e.g., time, place, activity and social setting. The system includes an ASR engine, e.g., in one or more provider computers 122, 124, 126 extracting candidates from each speech stream 112, 114. The ASR engine includes an acoustic model 130 and a language model 132.

Instead of requiring user training to generate data and maintaining a user data store from previously generated training data, the context store 134 stores previously recognized words, previously classified for users in the same or a substantially similar context(s) in a context model 136. Applying the context model 136 winnows multiple potential matches to select the most likely candidate based on use context. The context model 136 returns that matching candidate for appropriate action to the respective end-user, e.g., in an emergency center 138. The context model 136 is updated for each match. Adaptation, also in one of the provider computers 122, 124, 126, may update the acoustic model with each match.

Preferably, the context model 136 is a knowledge model or repository 134 containing previously collected information associated with a particular group of users/entities within one or more contexts. As noted for this example hereinabove, a context is the cross-relation between a number of situational variables. Context time may be the recognition time; context location may be the recognition destination, e.g., an end-user or an emergency support system; context activity may be relevant activity occurring at the recognition destination, e.g., an emergency; and social setting may be the current setting at the recognition destination, e.g., the local people or the socio-economical region. The context model 136 tracks the occurrence of each previous match. Further, as new matches are identified, the context model 136 is updated. During recognition, applying the context model 136 to winnow candidates increases the likelihood of selecting the correct word from multiple potential candidates.

Accordingly, whenever speech recognition provides multiple likely potential candidates, i.e., two or more words or sentences with a similar likelihood of matching; preferred context enhanced speech recognition applies statistical models to the recognition results to winnow the candidate list and eventually, select the most likely candidate as a match. The winnowing is based in considering that a certain context environment can potentialize frequent use of one or more particular words. Any particular emergency situation, such as reporting a fire for example, may occasion the frequent use of several words, such as "fire," "help" and "emergency." Preferred context enhanced speech recognition may develop a global context by cross-relating information from multiple end-users in the shared IT Infrastructure, e.g., the cloud, searching for patterns that define most likely results for the particular common contexts. A single final candidate is selected from the winnowing. The final matches may determine actions for reacting to ongoing events. The context model 136 adjusts to increase the probability of recognizing matching words in subsequent incoming speech in the same context.

Figure 6:
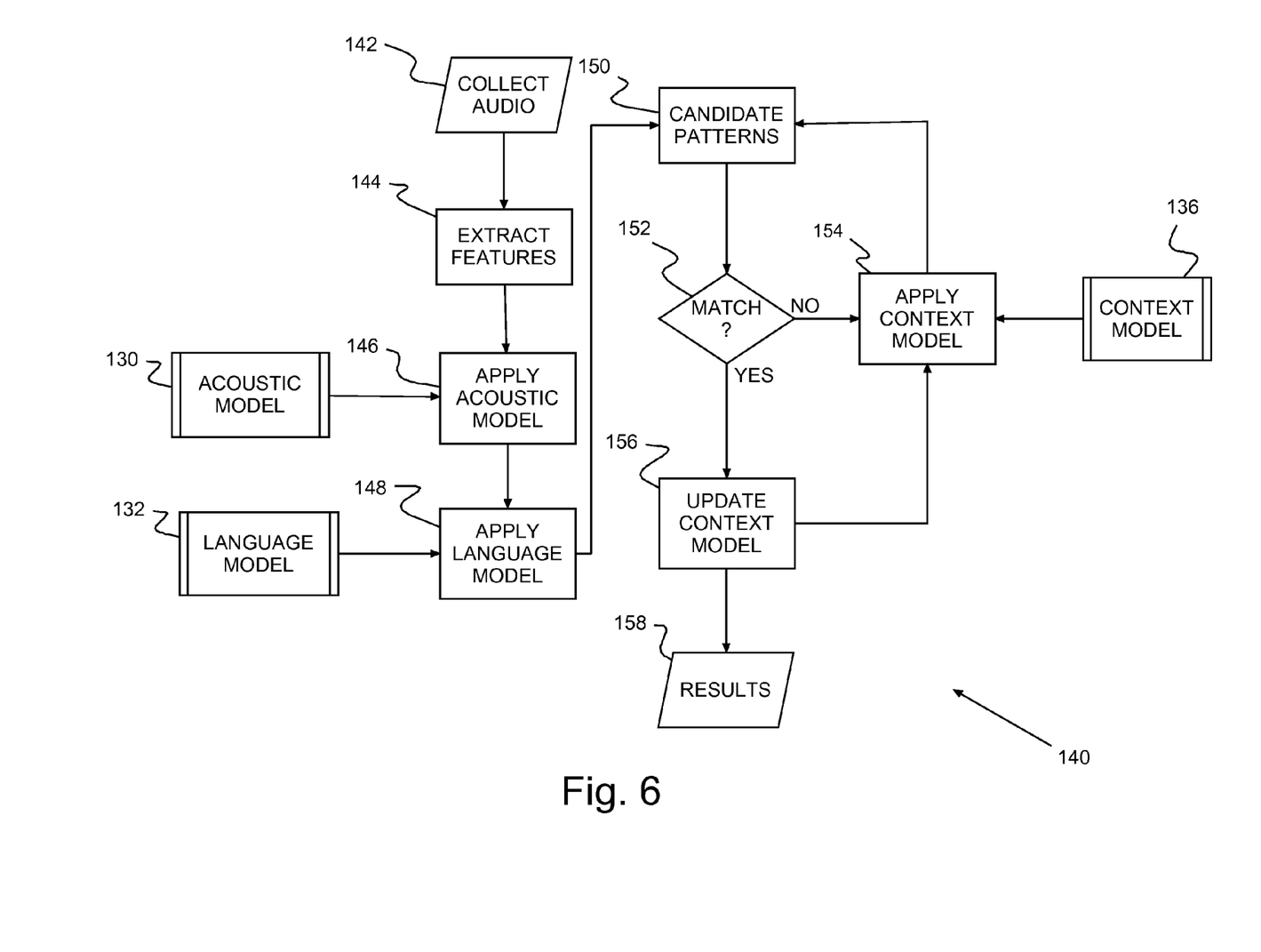
FIG. 6 shows an example of automatically recognizing speech responsive to user context according to a preferred embodiment of the present invention.

FIG. 6 shows an example of automatically recognizing speech 140 responsive to user context according to a preferred embodiment of the present invention. As each user speaks, a local user device collects audio 142, and, digitizes the raw audio. The local device forwards the audio with associated context, e.g., over network 116 in FIG. 5, to a provider computer for initial speech recognition 122. Initial speech recognition 122 begins with extracting features 144, applying 146 an acoustic model 130 to map utterances, and applying 148 a language model 132 to the utterances to generate textual speech patterns 150, e.g., list 102 in FIG. 4. The textual patterns 150 include one or more potential matches. If more than one match with similar likelihood is included 152, the context model 136 is iteratively applied 154 to winnow the list until a single candidate 150 is identified as a match 152. When a single candidate matches 152, the context model 136 is updated 156 with the match result, and the results of the recognition 154 are output, e.g., as transcription. Also, adaptation (not shown) may update the acoustic model with each match 152.

So, speech recognition begins with extracting features 144 from the digitized audio, and analyzing the acoustics characteristics of the digital signal. An acoustic model 146 maps utterances in the extracted features 144 to specific phones or syllables and words to facilitate speech pattern recognition. A language model 148 provides information about valid/usual word sequences for recognizing the speech patterns. The system statistically selects 150 textual patterns that best represent the raw speech signal. The selected patterns 150, listed candidates 102, indicate the likelihood 102P that the mapped candidates 102C correctly match the raw audio utterance(s).

If a single candidate has a likelihood or probability that exceeds the likelihood of the other candidates by some threshold, that candidate is a match 152. The threshold may be absolute (a number, e.g., 0.2), relative or a combination thereof. So, for example, for n candidates the threshold may be selected such that a match is found when one candidate has a likelihood that is at least one over n (1/n) larger than the other candidates and at least 20% more likely. Optionally, if applying the context model still does not arrive at a match, the threshold may be adjusted, e.g., automatically and incrementally, to arrive at a match. Frequently, the listed candidates 150 include two or more candidates that are potential matches, i.e., where for each likely candidate, the likelihood of at least one other candidate is within that threshold. With two or more correctly recognized candidates, no match 152 has been found yet.

When two or more potentially correct recognized candidates are identified 152, the context model 136 is iteratively applied 154 to winnow the list until a single candidate 150 is identified as a match 152. The context model 136 provides a dynamic likelihood of certain words in a specific context for recognizing the speech pattern. Dynamic because the model 136 is continually updated with matches. Preferably, the context model 136 applies 154 a weighting factor $w_n$ to each of the n candidate likelihoods.

Preferably also, the weights are normalized to the frequency of the most frequently occurring candidate. So, the context model 136 weights most heavily the candidate that has occurred most frequently with a weight factor (WF) of 1.0. The WF applied to the likelihood of the remaining candidates is proportional to the corresponding occurrence frequency to that most frequently occurring candidate. Again, when a single candidate matches 152, the context model 136 is updated 156 with the match result by either incrementing the word count for that matching candidate or by adding a new entry into the context model 136. Also, optionally, the results may be used to update (not shown) the language model for improved subsequent application 148.

Figure 7:
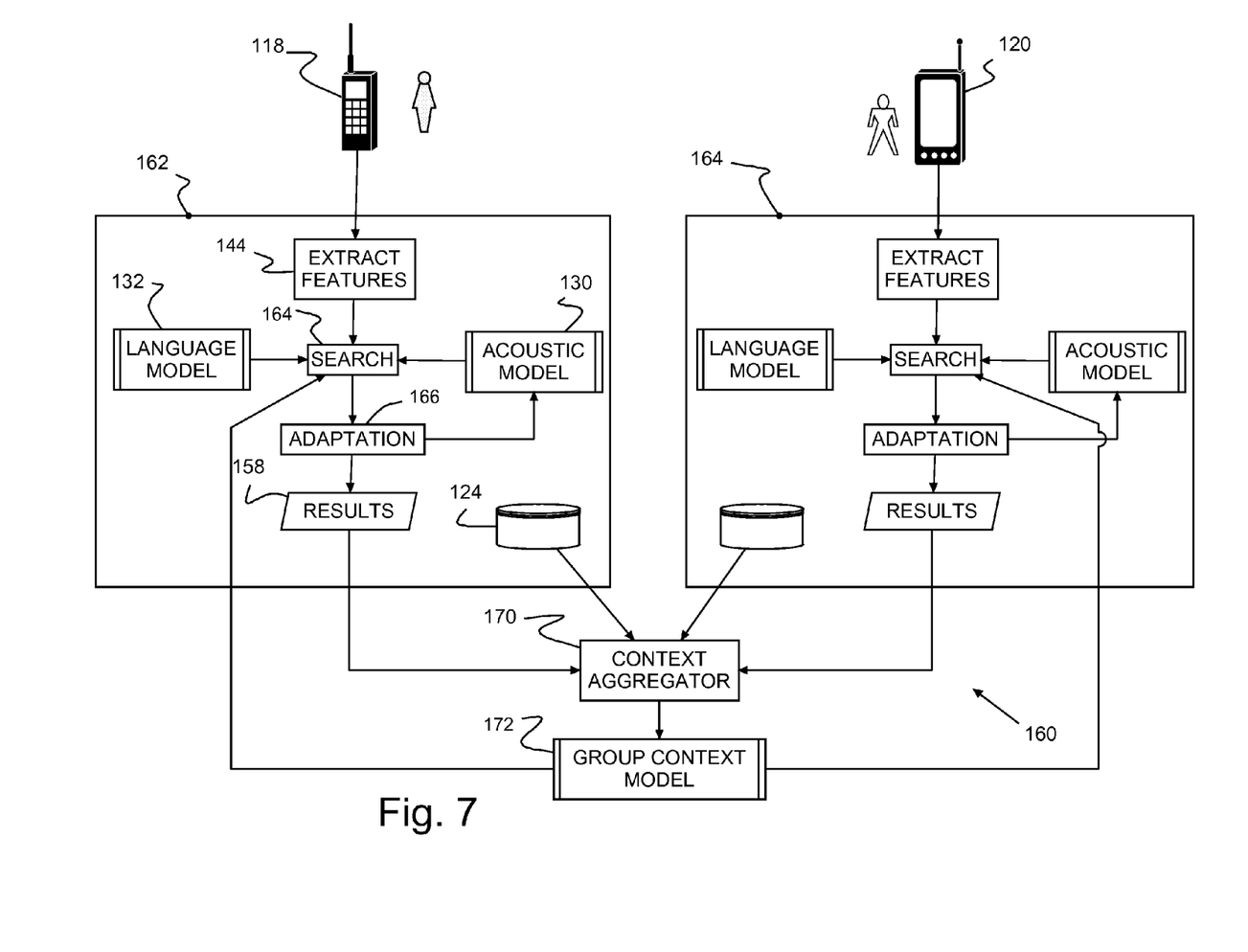
FIG. 7 shows a more generalized application of the preferred system in a cloud environment, wherein two (2) different users are associated to the same context, with resources allocated for preferred speech recognition.

FIG. 7 shows a more generalized application of the system 100 of FIG. 5 in a cloud environment 160, wherein two (2) different users at devices 118, 120 are associated to the same context, with resources 162, 164 allocated for preferred speech recognition 140 in FIG. 6 with like features labeled identically. Allocated resources 162, 164 collect audio 142, extract features 144, apply 146 an acoustic model 130 and apply 148 a language model 132 to generate candidate patterns 150. Search 166 winnows candidates where necessary, applying 154 the context model 136, when necessary, to arrive at recognition results 154. Adaptation 166 updates the acoustic model and the context model 136 from the recognition results 154.

User data 124 for each participating user is passed with the recognition results 154 for each user to context aggregator 170. Context aggregator 170 combines inputs from all users in the same context, e.g., a geospatial location, to globally recognize patterns in incoming speech substantially as described hereinabove for context recognition applied to individual words. Recognized patterns are used initially, to generate and subsequently, to update a group context model 172 creating a global context with recognized patterns further aggregated across users to provide a global count for each. Recognition further uses the group context model 172 to enhance, e.g., the language model 132, in recognition substantially as described hereinabove for context recognition.

So, in an example of fire emergency coordination with reference to FIGS. 5 and 6, devices 118, 120 place alerting calls originating from a fire incident, e.g., a 911 call to the emergency coordination center 128. The emergency coordination center 128 has previously created a global fire context model 172, e.g., counting words from previously recorded calls or, where necessary, on the fly from incoming calls. While each user may use different words more frequently than other users, some words may be used more frequently in the aggregate. In a fire emergency, for example, it is highly likely that there will be overlapping messages with likely words in each, including "fire," "smoke" and "fight." The preferred system selectively applies the context model 136 and global fire context model 172 to ambiguous results to enhance and improve match selection.

When, for example, a word for one user is recognized with high accuracy (i.e., the probability of the audio matching a different word is very low) that word is added to the group context model 176. Subsequently, audio from another user saying that same word produces an audio pattern with similar likelihood for two or more words. Applying the global context model 176 further refines recognition probabilities, to select that candidate as the most probable candidate.

Thus advantageously, the present invention provides an improved recognition precision sufficient for human to machine communication, especially where, although otherwise advisable, extensive training is infeasible, e.g., in call centers, for close captioning in live television (TV) broadcasts, and for emergency coordination centers. A preferred system continuously adjusts recognition by cross-relating information from multiple users in a global context, contextually improving recognition accuracy. Thus, the present invention substantially reduces the need for extensive ASR user training and for storage for maintaining large ASR training databases.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. An Automatic Speech Recognition (ASR) method comprising:
    extracting utterances from each of one or more audio streams, each audio stream being associated with a particular context; one or more computers extracting said utterances;
    generating textual candidates for each extracted utterance, one or more utterances having a plurality of textual candidates generated as potential matches;
    winnowing potential matches automatically with a context model within each particular context to adjust the likelihood of potential matches;
    selecting a single textual candidate for said each extracted utterance as a match, any selected textual candidate not having been previously matched for the current context being a new match; and
    updating said context model responsive to each match, wherein updating either adds the selected said textual candidate to said context model for the new match, or increases the likelihood for the previously selected said single textual candidate for the same particular context in the updated said context model, and said updated context model is used for winnowing subsequently extracted utterances.

2. An ASR method as in claim 1, wherein context is described by a cross-relation between a plurality of situational variables, and any said utterances having a single textual candidate generated are matched.

3. An ASR method as in claim 1, wherein generating textual candidates generates a probability for each potential match, said probability indicating the likelihood that the respective textual candidate is a match and wherein for each of said one or more utterances any single one of said plurality of textual candidates having a probability exceeding the probability of every other one of said plurality of textual candidates by a selected threshold is a match.

4. An ASR method as in claim 3, wherein winnowing potential matches automatically comprises:
provibing from previously recognized candidates weights indicating the likelihood of each said previously recognized candidate occurring in a respective particular context; and
weighting each said probability, said weights adjusting said likelihood.

5. An ASR method as in claim 4, wherein said context model maintains a count of each previously recognized word occurring within each previously encountered context, and updating said context model comprises updating a respective count, said each new candidate having the lowest count (1) of all previously recognized words within each said particular context.

6. An ASR method as in claim 5, wherein each said probability is weighted by the count of a respective said textual candidate for the respective context normalized to the highest count for said plurality of textual candidates.

7. An ASR method as in claim 1, wherein speech recognition is untrained speech recognition, said method further comprising receiving said one or more audio streams from one or more client devices.

8. An ASR method as in claim 7, wherein one or more provider computers are recognizing speech in said one or more audio streams, said one or more provider computers sharing capacity, resources and recognizing speech in a cloud environment, and context is device local context.

9. An ASR method as in claim 7, wherein said context model is a group context model, said one or more client devices being associated with group members, corresponding ones of said one or more audio streams being recognized in the same context.

10. An ASR method as in claim 2, wherein said situational variables include time, location, activity and social setting at the receiving end of a respective audio stream.

11. An Automatic Speech Recognition (ASR) method for recognizing speech without prior training, said ASR method comprising:
receiving one or more audio streams from one or more client devices, each client device being associated with a particular context;
extracting utterances from each of said one or more audio streams;
generating textual candidates for each extracted utterance and a probability that each candidate is a match, every utterance having a single textual candidate generated is matched, remaining utterances having a plurality of textual candidates generated are unmatched, each of said plurality of textual candidates being a potential match;
winnowing said plurality of textual candidates automatically for each of said remaining utterances with a context model within each said particular context to adjust likelihood of potential matches;
selecting a single textual candidate for said extracted utterance as a match, any selected textual candidate not having been previously matched for the current context being a new match; and
updating said context model responsive to each match, wherein updating either adds the selected said textual candidate to said context model for the new match, or increases the likelihood for the previously selected said single textual candidate for the same particular context in the updated said context model and said updated context model is used for winnowing subsequently extracted utterances.

12. An ASR method as in claim 11 wherein context is described by a cross-relation between a plurality of situational variables, and for each utterance any textual candidate having a probability exceeding the probability of every other textual candidate by a selected threshold is a match.

13. An ASR method as in claim 12, wherein said context model maintains a count of each previously recognized word occurring within each said particular context, updating said context model comprises updating a respective count, and winnowing potential matches comprises said context model weighting each said probability, said each new candidate having the lowest count (1) of all previously recognized words within each said particular context.

14. An ASR method as in claim 13, wherein said situational variables include time, location, activity and social setting of a respective client device, and each weighted said probability is weighted by the count of a respective said textual candidate for the respective context normalized to the highest count for said plurality of textual candidates.

15. An ASR method as in claim 11, wherein one or more provider computers are recognizing speech in said one or more audio streams, said one or more provider computers sharing capacity, resources and recognizing speech in a cloud environment, and context is context at a respective one of said one or more provider computers at the receiving end of a respective audio stream.

16. An ASR method as in claim 11, wherein said context model is a group context model, said one or more client devices being associated with group members, corresponding ones of said one or more audio streams being recognized in the same context.

17. A computer program product for Automatic Speech Recognition (ASR), said computer program product comprising a non-transitory computer usable medium having computer readable program code stored thereon, said computer readable program code causing one or more computer executing said code to:
extract utterances from each of one or more audio streams, each audio stream being associated with a particular context;
generate textual candidates for each extracted utterance, each textual candidate including a probability of matching said each extracted utterance, one or more utterances having a plurality of textual candidates generated as potential matches;
winnowing potential matches for said one or more utterances automatically with a context model within each respective said particular context for the respective utterance to adjust the likelihood of each of the respective potential matches;
select a single textual candidate for said each extracted utterance as a match, any selected textual candidate not having been previously matched for the current context being a new match; and update said context model responsive to each match, wherein updating either adds the selected said textual candidate to said context model for the new match, or increases the likelihood for the previously selected said single textual candidate for the same particular context in the updated said context model and said updated context model is used for winnowing subsequently extracted utterances.

18. A computer program product for ASR as in claim 17, wherein for each utterance any single textual candidate having a probability exceeding the probability of every other textual candidate by a selected threshold is a match, said one or more utterances having at least two textual candidates with a probability within said selected threshold of each other, and wherein context is described by a cross-relation between a plurality of situational variables.

19. A computer program product for ASR as in claim 18, wherein said context model maintains a count of each previously recognized word occurring within each said particular context, updating said context model comprises updating a respective count, and winnowing potential matches comprises said context model weighting each said probability, said each new candidate having the lowest count (1) of all previously recognized words within each said particular context.

20. A computer program product for ASR as in claim 19, wherein said situational variables include time, location, activity and social setting and each said probability is weighted by the count of a respective said textual candidate for the respective context normalized to the highest count for said plurality of textual candidates.

21. A computer program product for ASR as in claim 20, wherein said context model is a group context model, said one or more audio streams are streamed from client devices associated with group members, said one or more computer is a plurality of provider computers sharing capacity, resources and recognizing speech in a cloud environment and corresponding ones of said one or more audio streams being recognized in the same context.

22. A computer program product for Automatic Speech Recognition (ASR), said computer program product comprising a non-transitory computer usable medium having computer readable program code stored thereon, said computer readable program code causing a plurality of computers including provider computers executing said code to:
receive one or more audio streams from one or more client devices, each client device being associated with a particular context;
extract utterances from each of said one or more audio streams;
generate textual candidates for each extracted utterance and a probability that each candidate is a match, every utterance having a single textual candidate generated is matched, remaining utterances having a plurality of textual candidates generated are unmatched, each of said plurality of textual candidates being a potential match;
winnow said plurality of textual candidates for each of said remaining utterances automatically with a context model within each said particular context to adjust likelihood of potential matches;
select a single textual candidate for said extracted utterance as a match, any selected textual candidate not having been previously matched for the current context being a new match; and
update said context model responsive to each match, wherein updating either adds the selected said textual candidate to said context model for the new match, or increases the likelihood for the previously selected said single textual candidate for the same particular context in the updated said context model and said updated context model is used for winnowing subsequently extracted utterances.

23. A computer program product for ASR as in claim 22, wherein:
context is described by a cross-relation between a plurality of situational variables;
for each utterance any single textual candidate having a probability exceeding the probability of every other textual candidate by a selected threshold is a match, said one or more utterances having at least two textual candidates with a probability within said selected threshold of each other;
said context model maintains a count of each previously recognized word occurring within each said particular context, updating said context model comprises updating a respective count, said each new candidate having the lowest count (1) of all previously recognized words within each said particular context; and
winnowing potential matches comprises said context model weighting each said probability.

24. A computer program product for ASR as in claim 23, wherein said situational variables include time, location, activity and social setting and each said probability is weighted by the count of a respective said textual candidate for the respective context normalized to the highest count for said plurality of textual candidates.

25. A computer program product for ASR as in claim 24, wherein said context model is a group context model, said one or more audio streams are streamed from client devices associated with group members, said one or more computer is a plurality of provider computers sharing capacity, resources and recognizing speech in a cloud environment and corresponding ones of said one or more audio streams being recognized in the same context.

* * * * *